United States Patent

Brewer

Patent Number: 5,142,780
Date of Patent: Sep. 1, 1992

[54] ELECTRIC CABLE STRIPPING TOOL WITH CLAW

[76] Inventor: George I. Brewer, Box 113, Fulford Harbour, B. C., Canada, V0S 1C0

[21] Appl. No.: 721,081

[22] Filed: Jun. 25, 1991

Related U.S. Application Data

[63] Continuation of Ser. No. 498,592, Mar. 22, 1990, abandoned.

[51] Int. Cl.$^5$ .......................... B26B 27/00; B26B 23/00
[52] U.S. Cl. .................................................. 30/294; 30/90.4
[58] Field of Search .................. 30/294, 90.2, 90.4, 30/90.7, 90.8, 91.1, 91.2

[56] References Cited

U.S. PATENT DOCUMENTS

| D. 254,243 | 2/1980 | Frorian | 30/294 |
| 256,700 | 4/1882 | Jincks | 30/294 |
| 541,963 | 7/1895 | Carpenter | 30/294 |
| 642,689 | 2/1900 | Garllus | 30/294 |
| 992,439 | 5/1911 | O'Brien | 30/294 |
| 3,241,236 | 3/1966 | Capps | 30/294 |
| 4,198,751 | 4/1980 | Egbert | 30/90.4 |

Primary Examiner—Douglas D. Watts
Assistant Examiner—Paul M. Heyrana, Jr.
Attorney, Agent, or Firm—David Pressman

[57] ABSTRACT

A small, hand-held tool for removing the outer sheath of plastic material covering a bundle of individually insulated electric conductors, with special capacity for the twisted surface of three-conductor non-metallic sheath cable. Important features of the tool include a short, dull, hook-shaped claw for safely effecting an opening in the side of the sheathing sufficient to admit the guide-shoe at the tip of the blade; a crescent-shaped blade for both slitting the sheathing and for chopping off the residue of slit sheathing; a thin, flat shoe with its broadest part near the leading edge; and a handle so shaped with gripping lobes and so positioned relative to the shoe as to offer a firm pulling grip while permitting the first finger and thumb to help position and guide the tool during the slitting operation.

4 Claims, 2 Drawing Sheets

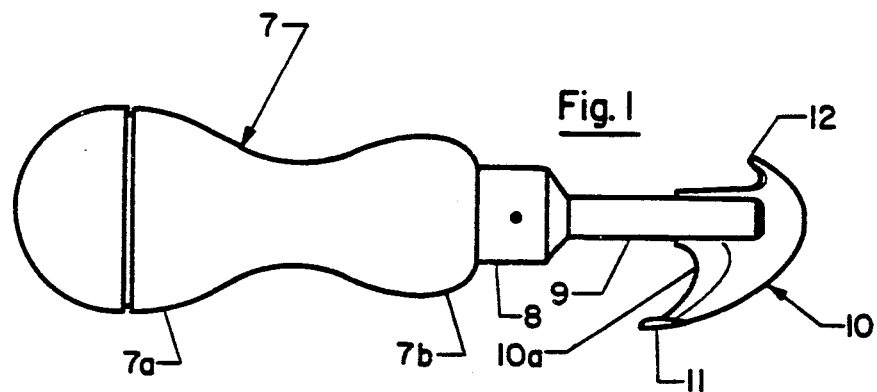
Fig. 1
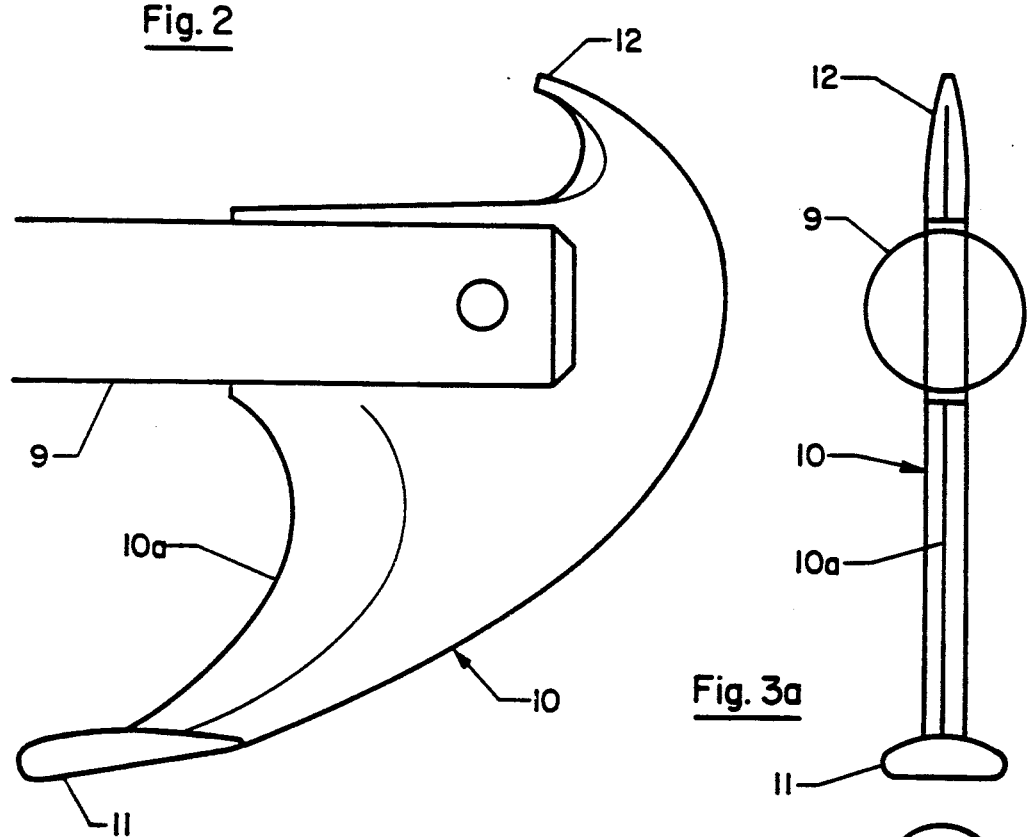
Fig. 2
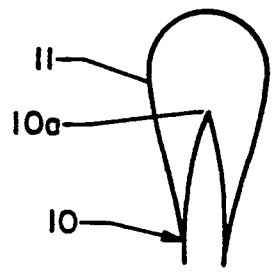
Fig. 3a
Fig. 3b

ELECTRIC CABLE STRIPPING TOOL WITH CLAW

BACKGROUND—CROSS REFERENCE TO RELATED APPLICATION

This is a continuation of Application Ser. No. 07/498,592, Filed Mar. 22, 1990, now abandoned.

BACKGROUND—FIELD OF INVENTION

This invention relates to electrical cable stripping tools—those intended to remove the outer sheathing from a bundle of insulated electric conductors.

BACKGROUND—PRIOR ART

Three-conductor non-metallic sheath cable consists of three insulated wires and one bare ground wire, laid together in a twisted or spiral pattern, and covered by a thin, tight plastic sheath. Because of its uneven, twisted surface it can be difficult for any cable stripping tool to negotiate.

In North America, most three-conductor cable is stripped with pocket knives, linoleum knives, and a variety of homemade tools, all of which usually damage the insulation of the conductors below the sheathing and contribute to short circuits and fire hazards.

Other prior stripping tools are intended for telephone cable, which has a smooth surface and is round in cross section. No prior-art stripping tool of which I am aware makes any reference to three-conductor cable. The following is a synopsis of prior stripping tools:

Tools Without Guide Shoes: First to be considered is that group of prior tools which does not include a guide shoe under or at the tip of the blade.

Bawa, in U.S. Pat. No. 3,906,561 (1975), shows a device which is an appendage to a large two-handed tool. Bawa's device is difficult to center and keep centered during slitting, and lacks depth control.

Undin, in U.S. Pat. No. 4,472,877 (1975), shows a tool featuring depth adjustment, but requiring a smooth surface and circular cross-section of cable to function. An annular or circumferential cut (for detaching the length of slit sheathing, but often made first) would touch three-conductor sheathing in only three places, and a longitudinal slit would require the tool to spiral around the cable.

Haas, in U.S. Pat. No. 4,507,867 (1985), shows a large metal-cutting tool, but the tool hand is too far removed from the point to permit accurate manipulation in a small cable, and the point presents some danger to the other hand.

Dunbar, in U.S. Pat. No. 4,897,920 (1990), shows a tool, which is intended for cable that is perfectly round in cross-section. While Dunbar states that his tool will not veer off a smooth surface, I believe that his tool will tend to veer off the twisted, uneven surface of three-conductor cable.

All of the prior stripping tools of the type which lacks a guide shoe at the tip of the blade have an additional shortcoming: the length of the blade from point to hilt (or other limit to penetration) must be exactly the thickness of the sheathing to be cut. Three-conductor cable has a different thickness of sheathing for each diameter of cable, and the electrician usually installs a number of sizes of cable at the same time. Also, since there is no subsheathing nor any type of buffer between the sheathing and the insulation of the electrical conductors within three-conductor cable, there is no tolerance for error.

Tools With Guide Shoes: Prior stripping tools which feature a shoe or guide shoe on the tip of the blade have an advantage, provided that the shoe, which slides against the inner surface of the sheathing, is not so large in cross section as to be unable to pass between the tight sheathing and the electrical conductors within, nor so narrow, thin, or sharp as to rupture the sheathing and pull out before the slitting operation is complete. Neither can the shoe be so long as to cause friction in attempting to traverse what is essentially a non-linear path.

Vaughan and Horrocks, in U.S. Pat. Nos. 2,691,822 (1954) and 3,831,274 (1974), respectively, provide examples of a tool with a long shoe, having full continuous width which causes excessive friction and stretching of the sheathing. Vaughan's leading edge, which is too narrow, and Horrocks', which is too sharp, are apt to come out through the sheathing. Both have screwdriver handles with longitudinal protuberances designed for twisting rather that for pulling or pushing.

Parker, in U.S. Pat. No. 2,616,172 (1952)), shows a tool with a short shoe, but that advantage is lost by its being very narrow and thus very prone to pierce the thin sheathing, particularly of the smaller three-conductor cable. Insofar as the large handle of Parker's tool, including the "guide member", extends to within 32 mm (⅛ inch) of the shoe, it is an encumbrance to rapid positioning of the tool preparatory to the slitting operation. Lastly, Parker's tool lacks a capability for separating the residue of slit sheathing or for piercing the side of the sheathing in order to begin the slitting anywhere but at the end.

Stabs, in U.S. Pat. No. 3,162,945 (1964), shows a tool including on its end an "arcuate auxiliary cutting edge" to make the initial cut in the sheathing, but there is neither depiction nor mention of means to limit the depth of cut and thus prevent injury to the insulation of the electrical conductors within. The relative narrowness of the leading end of the shoe and the "transversely arcuate bottom surface formation" of the shoe—adding height to the shoe—combine to stress the sheathing and promote the likelihood of the narrowed leading surface pulling through. The handle of Stabs, tool does not provide a firm and comfortable grip, and finally, the "annular cut" as depicted is very difficult on the triangular cross-section of three-conductor cable, while alternatively, to attempt the chopping off or pruning method with the blade shape of Stabs, tool causes the sheathing to clog in the corner where the blade joins the handle.

Antisdel, in U.S. Pat. No. 4,433,484 (1984), shows a tool having at one end a cable sheathing stripper which includes a hook-shaped formation resulting from a notch cast in the handle. The hook-shaped piece is of sufficient width and height as to cause excessive friction while sliding beneath a cable sheathing, and the leading edge of the hook-shaped piece is sufficiently sharp to catch and pull through the sheathing.

In view of the serious limitations of prior stripping tools when applied to three-conductor cable, it becomes apparent why the tools of preference or of necessity remain the pocket knife, the linoleum knife, and a variety of homemade devices.

OBJECTS AND ADVANTAGES

The most important objects and advantages of the present invention when compared to the prior stripping tools which lack a guide shoe are that:

a) It provides a tool which will slit cable sheathing of varying thickness.
b) It provides a tool which will slit cable sheathing of uneven and asymmetrical surface.
c) It provides a tool which will not cut into wire insulation below the sheathing.
d) It provides a tool which will not injure the other hand or arm of the user as a consequence of its blade accidently pulling free while slitting the cable.

Further objects and advantages of the present invention, where compared to prior stripping tools which include a guide shoe, are as follows:

a) It provides a tool which will strip an uneven, twisted surface with thin, tight sheathing, as found on smaller diameter three-conductor cable.
b) It provides one tool which performs the three separate operations of safely opening the side of the sheathing, slitting a length of sheathing, and chopping off the residue of slit sheathing.
c) It provides a tool with handle so shaped and situated near the blade, as to permit the tool-hand to position and guide both claw and blade on the cable for increased accuracy and speed.
d) It provides a tool with both claw and blade tip so blunted, as to be safe to use and to carry.

Additional advantages will be made apparent in the Drawings and Description to follow.

BRIEF DESCRIPTION OF THE DRAWINGS

FIG. 1 is a side view of a stripping tool according to the invention.

FIG. 2 is a side view of the blade, shoe, and claw.

FIG. 3a is a front elevation of the blade, shoe, and claw.

FIG. 3b is a plan view of the shoe.

Figure 4:
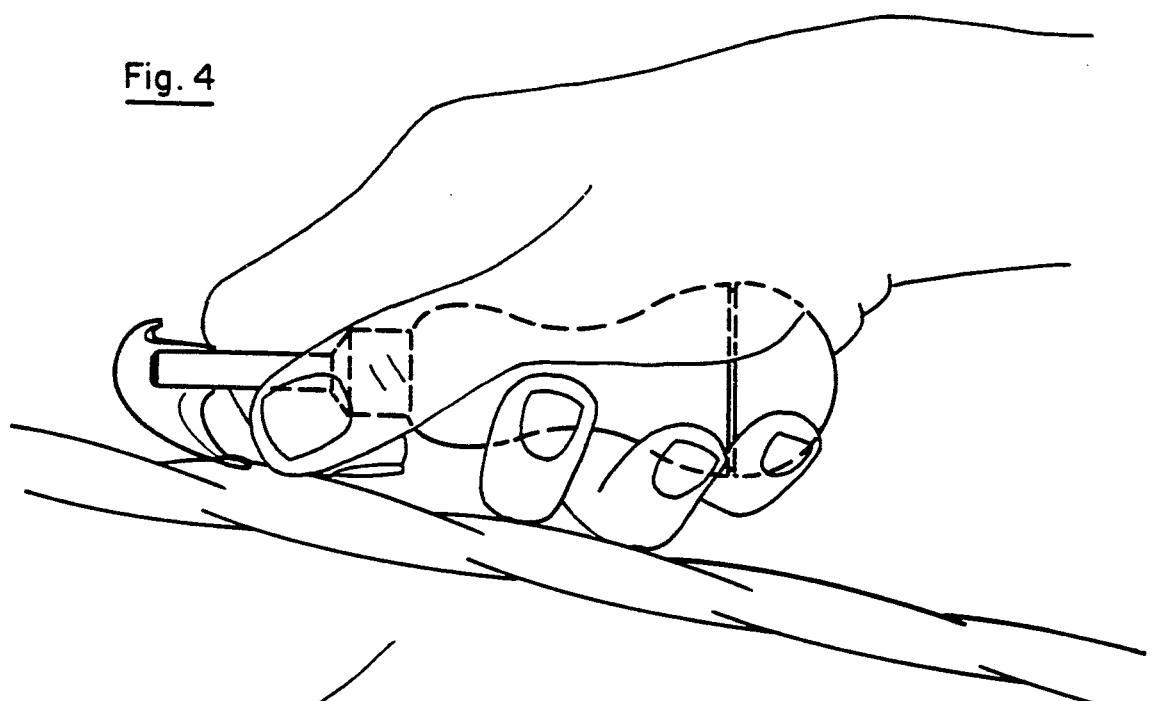
FIG. 4 is a side view of the tool of FIG. 1 slitting a three-conductor cable.

REFERENCE NUMBERS 7. handle
7a. gripping lobe
7b. gripping lobe
8. ferrule shoe
9. shank
10. blade
10a. cutting edge
11. shoe
12. claw

DESCRIPTION—FIGS. 1, 2, 3

FIG. 1 shows a side view of a typical embodiment of a stripping tool according to the invention. It has a handle, 7, preferably of turned wood as shown, which consists essentially of two gripping lobes of protuberances 7a and 7b to provide a firm pulling grip, with a metal ferrule 8 and pin for attachment to metal shank 9. The shank joins the handle to a steel blade 10, including a claw 12, and may be fastened to the blade as depicted or integrally molded or forged with it.

Blade 10 carries on its forward part a concave or U-shaped cutting edge 10a of which only the lower 6.4 mm ($\frac{1}{4}$ inch) above the shoe is needed for slitting, while the entirety of edge 10a is used for subsequently pruning off the residue of slit sheathing. The lower segment of the cutting edge is well sloped back to effect a slicing action against the sheathing, permitting the blade to be effective even when dull.

Shoe 11, as is more clearly shown in the enlarged FIG. 2 and FIG. 3A is about 4.8 mm (3/16 inch) in width and 1.6 mm (1/16 inch) in elevation and thickness. The full rounding of the leading edge and the sides of the shoe is shown in FIGS. 2 and 3. Overall smoothness of the shoe is essential in a sheath stripper as it is dealing with a tightly-stretched rubber-like substance which is easily ruptured. The plan or top view of the shoe, FIG. 3b, shows the leading edge, an approximate 4.8 mm (3/16 inch) semi-circle, and the sides of the shoe as they converge rearwardly to merge into the thickness of the blade.

Just as the sides of the shoe are relieved toward the rear, so the trailing end of blade 10 is relieved upward from the end of the shoe, as shown in FIG. 2. Enough width is left at the lower part of the blade to insure adequate strength. The reason for the above-described shoe shape and blade shape is, most simply stated, that the leading edges of each are the most important parts, and the after parts are an encumbrance when passing under the tight sheathing of uneven cable.

OPERATION—FIGS. 4, 5, 6

Figure 6:
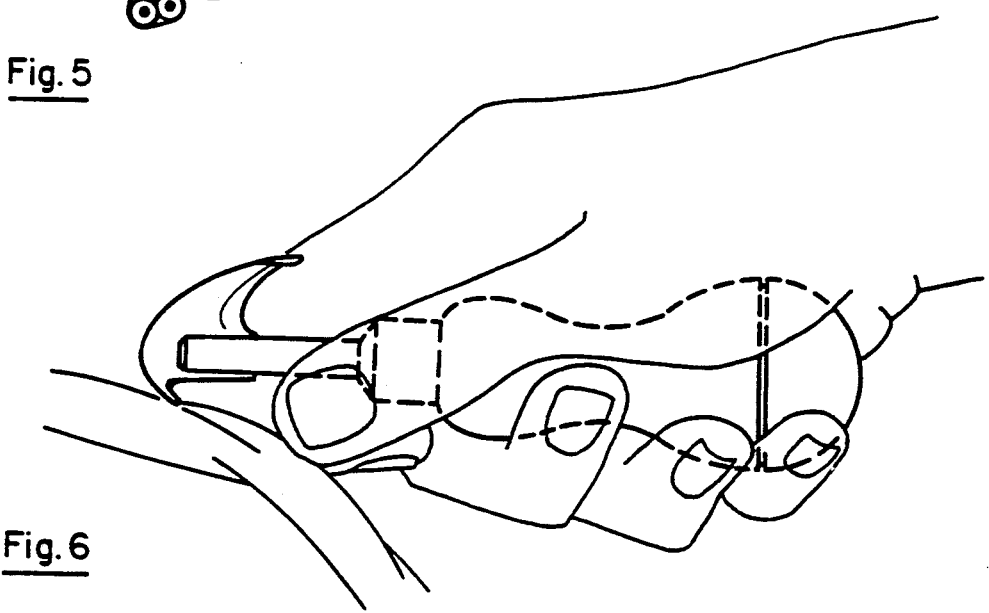
FIG. 6 is a side view of the claw of the tool of FIG. 1 in use.

The Claw in Use: FIG. 6 depicts the clawing of an opening hole in the cable sheathing. Because of the calculated proximity of the handle to the claw, the user's first finger and thumb grasp the cable and position the claw. Then by forcing the claw against the cable and pulling parallel to the cable at the same time, the claw first causes a dimple or depression in the soft plastic sheathing and then a tear or rupture (just as one's finger will tear a hole in a plastic grocery bag). The claw will then pull out, leaving an adequate entry hole for shoe 11. Danger to internal wires or to the operator is minimal because the claw, while sharp enough to catch in the soft plastic sheathing, is not sharp enough to cut. The claw may also be deployed in a prying motion like the claw of a hammer if the cable is not fastened in place or if pulling is inconvenient.

Figure 5:
FIG. 5 is and end view of the tool of FIG. 1 and cross-section of three-conductor cable during the slitting operation, showing position of thumb and first finger.

The Slitter in Use—FIGS. 4 and 5: The tool is then rotated 180 degrees in the hand and shoe 11 of the blade is inserted in the hole. The other hand may pull the cable straight and hold it or let go. The tool hand sets thumb and knuckle of the first finger atop the cable equidistant from the shoe of the tool as depicted in FIG. 5 and somewhere immediately in front of the shoe as shown in FIG. 4, according to the size of the hand and the comfort of the grip. (The shank may easily be changed in length and repinned to the handle). Because of the calculated proximity of handle 7 to shoe 11, the thumb and knuckle of the tool hand are able to maintain the correct angle of elevation of the shoe tip as shown in FIG. 4, and center it as shown in end view FIG. 5. The thumb and knuckle further sense the progress of the slitting of the cable and provide lift and lateral direction for the shoe to keep the tool from being pushed astray by the spiralling conductors within the cable, lift and lateral direction being effected by the thumb and knuckle pushing down against the cable as it slips by.

To emphasize the importance of the above, FIG. 4 depicts the undulating path along the cable surface which the stripping tool must follow when slitting the sheathing of three-conductor electric cable. Every 5.08 cm (2 inches) of ⅜ inch (9.5 mm) cable and every 12.7 cm (5 inches) or so of 1¼ inch (3.18 cm) cable the shoe of the tool must pass over the top of a conductor where it presses tightly against the sheathing and then descend into the hollow between conductors. The thumb and knuckle of the first finger of the worker provide lift to assist the tool over and past these obstructions and constrictions, but the sheathing is thin and the shoe of the tool will pierce it if too much lift is exerted. And considering the wide variety of three-conductor cable in use, each with a different thickness of sheathing, it becomes clearer why the thumb and finger provide a better means for guiding the shoe of the tool than would a mechanical device.

Chopping Off the Residue: With the completion of the slitting operation there remains a loose length of slit sheathing still attached by one end. The free hand grasps this length of slit sheathing and holds it out at a right angle from the cable or up at an acute angle. Then the blade of the tool is set over this loose length like a pruning hook, as near its beginning point or junction as is convenient, and with one quick pull the loose sheathing is cut off. (The larger cable requires more than one quick pull, and on cable of diameters approaching 3 inches (7.62 cm) and above the tool executes a circumferential cut in the same manner as it does a linear cut.)

SUMMARY

By combining the following features into one tool, the present stripping tool performs the three necessary operations of opening the side of the sheathing, slitting a length of it, and cutting off the residue of slit sheathing. The features are:

a) a hook-shaped claw, about as dull as the tooth of a hair comb, to open the sheathing (without cutting into conductor insulation) sufficiently to admit the shoe of the blade;

b) a shoe shaped specifically to negotiate the unevenness and constrictions of three-conductor cable—flat, short, and broad in front, and narrow at the rear;

c) a crescent or U-shaped blade cut-away behind the shoe to prevent drag and obstruction, gently tapered above the shoe to impart slicing action while slitting and crescent shaped overall like a pruning hook to cut off the length of slit sheathing with one quick pull;

d) a handle shaped and positioned for pulling while allowing the first finger and thumb of the tool-hand to be close enough to the shoe and the claw to help position the tool in the cable sheathing and help guide it while slitting.

The advantages provided by feature (d) are better control, ease of operation, and increased speed. When necessary, the entire operation can be performed by one hand alone, in the dark. Further advantages of the tool are that it is small, lightweight, and easily carried in an electrician's tool belt. Also, since both its claw-tip and blade-tip are blunted, the tool is relatively safe to handle.

Alterations in sizes and proportions of parts, including the shape of the handle, are intended to be within the spirit of the invention. For example, the tool can be individualized for use by specialists in the electrical field, or to suit the size of the hand. Accordingly, the scope of the invention should be determined by the appended claims and their legal equivalents, and not by the example given.

I claim:

1. A manually operated tool for removing an outer sheathing of plastic material from a bundle of individually insulated electrical conductors, especially for three-conductor cable laid in a spiral pattern, comprising:

a. a handle with pulling lobes or grips;
   b. a shank extending from an end of said handle, said shank having a bottom side;
   c. a blade extending downward perpendicularly from said bottom side of said shank, said blade having a forward part facing in the direction of said handle;
   d. said blade having on said forward part a U-shaped concave cutting edge, said concave cutting edge having a lowest and most distal extremity terminating in a shoe;
   e. said shoe having a generally flat bottom, said shoe having a leading edge and sides which are in elevation convex and fully rounded, the thickness or elevation of said shoe being approximately 1/16 inch (1.6 mm) or under but being sufficiently thick to insure bluntness of said leading edge, said leading edge having a half-circle shape in plan, the sides of said shoe in plan converging rearwardly toward each other to merge with a trailing edge of said blade at a point where said bottom of said shoe ends, with said trailing edge of said blade sloping diagonally rearward and upward from said shoe and continuing on above said shank to merge with a claw, said trailing edge of said blade merging with a trailing edge of said claw;
   f. said shank having a top side from which said claw extends upwardly and forwardly toward said handle at an angle less than 45 degrees, said claw being shaped so as to be able to make an opening in a side of said cable sheathing sufficiently large to admit said shoe of said blade, said claw having a U-shaped concave leading edge facing said handle, a top segment of said U-shaped leading edge extending forwardly and terminating in a truncated point, a bottom segment of said U-shaped leading edge extending forwardly toward said handle and downwardly to join said shank and merge with said blade;

Thereby to provide a single tool which rapidly performs the three operations necessary to conveniently remove a sheathing of plastic material from electric cable: first, to safely claw an opening in the side of the sheathing sufficient to admit the shoe of the blade; secondly, to slit a length of sheathing, and thirdly, using the blade as a pruning hook, to chop off the residue of slit sheathing.

2. The tool of claim 1 wherein said handle is positioned at such distance from said shoe that the thumb-tip and first knuckle of the first finger of a gripping hand are naturally positioned approximately ½ inch (1.27 cm.) in front of and at a level with the top of said shoe, such that said thumb and said first knuckle may make contact with said cable and provide lift and lateral direction to said shoe and blade during a slitting operation.

3. The tool of claim 1 wherein said leading edge of said shoe is approximately a 3/16 inch (4.8 mm.) diameter semi-circle in plan; the sides adjoining said leading edge converging to the rear to a terminal width equal to the thickness of said blade, the overall length of said shoe being less than twice its width; the thickness or elevation of said shoe being about 1/16 inch (1.6 mm)

or less with said leading edge and sides being convex and with their radii merging into the flat part of said top and said bottom of said shoe, said top of said shoe being flat to minimally arched.

4. The tool of claim 1 wherein said claw is truncated at its extremity to roughly approximate the face of a tapered punch, whereby said claw with said extremity is able to puncture said plastic sheathing of electric cable, yet successfully avert penetration of said insulated conductors within said sheathing.

* * * * *